United States Patent Office 3,349,631
Patented Oct. 31, 1967

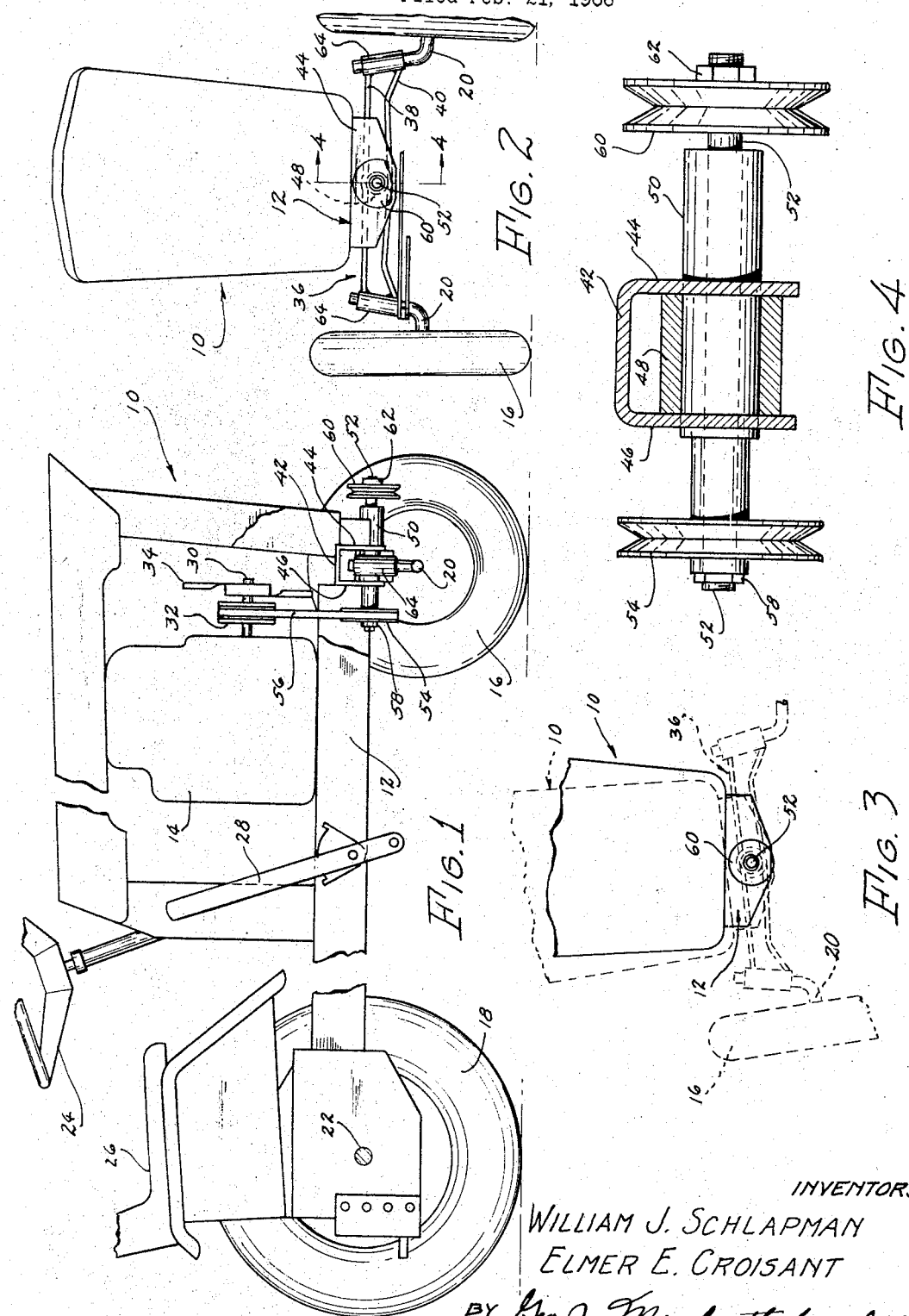

3,349,631
FRONT AXLE AND PTO SHAFT
William J. Schlapman and Elmer E. Croisant, Winneconne, Wis., assignors to Colt Manufacturing Company, Inc., Winneconne, Wis., a corporation of Wisconsin
Filed Feb. 21, 1966, Ser. No. 528,924
9 Claims. (Cl. 74—15.63)

This invention relates to an attachment drive and more particularly to a power take-off drive for a tractor.

The majority of the agricultural and industrial-type tractors have a power take-off shaft which is driven from the engine and which extends in a rearwardly direction to drive various pull-type implements. With the advent of the smaller or garden-type tractors, the preferred means for driving attachments is to transmit the power from the front of the engine by means of sheaves and pulleys, universal joints, or sliding spline shafts. Some of these drives have been directed to one side of the tractor from the engine crankshaft, then forward or rearward, as required, and then back to a position more nearly in line with the engine, to drive the attachment. This has been a problem where the attachment or implement is carried or is driven ahead of the tractor and at the same time where the implement requires a dependable, simple, sturdy and efficient drive means. A front mounted power take-off drive is especially desirable for driving a compressor or an auger or conveyor as the hook-up can be quickly and easily made to the source of power.

The main object of the present invention is to provide a simple and dependable drive means for a front mounted or driven attachment or machine.

Another object is to provide a frontal drive means which is substantially aligned with the engine crankshaft.

A further object is to provide a drive means which does not bind or twist due to its disposition in relation to the engine crankshaft and the tractor frame.

Another object is to provide a drive means which remains substantially in a predetermined position in relation to the engine crankshaft when the wheels of the tractor are raised or lowered.

A further object is to provide a rigidly mounted frontal power drive which is positively oriented to both the frame and the axle.

Additional objects and advantages will become apparent from a reading of the following specification and the annexed drawings, in which:

FIGURE 1 is a side elevational view of a tractor embodying the present invention;

FIG. 2 is a front elevational view of the same;

FIG. 3 is a front elevational view showing the disposition of the invention when one of the front wheels of the tractor is raised; and FIG. 4 is a view taken on the line 4—4 of FIG. 2.

As seen in FIG. 1, the invention is shown as an attachment or power take-off drive for a tractor, generally designated as 10, the tractor having a frame 12, an engine 14, front steering wheels 16, rear traction wheels 18, the front wheels being journaled on axles 20 and the rear wheels on axles 22. The tractor also includes a steering wheel 24, an operator's seat 26 and a handle or lever 28 for regulating and controlling the disposition of tractor attachments. These features of the tractor are considered to be conventional and it is believed that no further description is necessary except as they relate to the invention.

The engine includes a crankshaft 30 extending forwardly of the engine, the crankshaft carrying a driving sheave or pulley 32 and a fan 34. In the tractor shown, the fan is used to cool the hydraulic fluid which travels through piping disposed ahead of the fan, the fluid being used as a medium of transmitting energy in the tractor control and drive system.

A front axle assembly, generally designated as 36, supports the front part of the frame 12 and, of course, the front part of the tractor. Axle assembly 36 has an upper member 38 and a lower member 40, more clearly shown in FIG. 2, member 38 being constructed of a generally horizontal flat piece and disposed transverse to the direction of travel. The lower member 40 is constructed of a generally horizontal piece, however, the outer portions are slightly inclined or slanted to provide additional strength to support the frame 12. Fixed to the frame 12 is a support having a top portion 42, a front portion 44 and a rear portion 46. As seen in FIG. 2, front portion 44 and rear portion 46 have inclined sides for a purpose to be described. Disposed between and engaging with portions 44 and 46 is a rounded bearing support portion 48, of axle assembly 36, this portion being substantially on the centerline of the tractor in a fore-and-aft direction. Portion 48 carries a bearing 50 also extending in a fore-and-aft direction generally on the centerline of the tractor. It is thus seen that the front axle assembly 36 is constructed such that the axle itself provides and defines an appropriate place to support a frontal drive means from the engine.

Bearing 50 carries a drive shaft or power take-off drive 52 which shaft is rotatably supported in bearing 50 and shaft 52 extends forwardly and rearwardly of axle assembly 36 in a fore-and-aft direction. Shaft 52 carries a driven pulley or sheave 54 which is fixed on shaft 52 for driving the shaft. A drive means in the form of a belt 56 drivingly connects pulley 32 and pulley 54. Pulley 54 is retained on shaft 52 by means of a nut 58. As seen in FIG. 1, the driving pulley 32, the drive belt 56 and the driven pulley 54 are disposed rearward of the axle assembly 36 with shaft 52 extending through axle 36. The portion of shaft 52 forward of axle 36 carries a pulley or sheave 60 fixed on shaft 52, the pulley 60 being secured by a nut 62. Pulley 60 is a driving means for attachments or machines carried or driven from the front of the tractor.

While there are attachments for a garden tractor, which require drive means to the underside of the tractor, such as a rotary mower, or attachments which require a drive to the side and forward of the tractor, such as a snow blower, or attachments which require a drive to one side such as a sickle bar mower, the invention is a simple and convenient means to provide a drive for a compressor, a grinder or a conveyor by utilizing the front axle assembly to support the drive.

As stated above, the lower member 40 of axle assembly 36 has slanted or inclined outer portions and these portions are secured to an axle member bearing 64. There is one of these bearings for each front wheel, the upstanding portion of members 20 being constructed to rotate in bearings 64 whenever the front wheels are turned to change direction of travel of the tractor through the steering mechanism.

The configuration of support portions 44 and 46 is important in the travel of the tractor wheels as there usually is required a certain amount of clearance when the tractor is moving over uneven ground. When either one of the front wheels is raised or lowered in relation to the frame of the tractor or to the rear wheels, the axle must follow a direction such that it can rotate or pivot a certain amount. As seen in FIG. 3, if the left-hand front wheel moves downwardly due to a low place or hole in the ground, the axle 36 moves slightly in a clockwise direction, however, the frame 12 and the balance of the tractor will stay on a substantially even keel in relation to the ground surfaces. In like manner, when the right-hand front wheel moves downwardly or lowers into a hole or low place, the axle 36 moves in a counterclockwise direction. This is also true when one of the rear wheels is raised or lowered and the front wheels are not raised or lowered due to uneven ground, as in the case when turning a corner, the axle 36 will also be pivoted a certain amount and in a certain direction depending upon which wheel is raised or lowered by reason of a rise or a depression in the ground surface.

Whenever a front wheel or a rear wheel is raised or lowered, the axle assembly 36 will turn or pivot on the centerline of the tractor due to the construction of the bearing support portion 48 in relation to the axle. The present invention is a means for maintaining a drive for an attachment in a predetermined position regardless of the disposition of the wheels of the tractor. The invention is a simple and dependable drive means, it is substantially aligned with the crankshaft of the engine and it does not bind or twist when the tractor or attachment plane is altered due to uneven ground.

It is thus seen that herein described is a drive means or attachment drive in the form of a power take-off shaft which extends through the front axle of a tractor, which is substantially aligned with the engine crankshaft and which is maintained in a position such that the drive means remains taut and is not affected by changes in a planar direction of the tractor or the attachment.

It is believed that the drawings and the above description fully disclose and explain the invention and that embodiments other than those described may occur to those skilled in the art. It is to be understood that all such variations are considered to be within the scope of this invention. The invention as described is not intended to be taken as limited by the embodiment disclosed nor in fact in any manner except as defined in the annexed claims.

What is claimed as new and desired to be secured by Letters Patent of the United States is:

1. An attachment drive for a tractor having a frame, an engine carried on the frame, steering and traction wheels, and front and rear axles, said attachment drive including a driving sheave connected to said engine on the front thereof, driving means rotatably supported from said front axle, a driven sheave on said driving means aligned with said driving sheave, and
   means drivingly connected to said driving and driven sheaves, said driving means being positioned such that said driving means remains substantially in a predetermined position when either one of the wheels is raised or lowered.

2. An attachment drive in accordance with claim 1 wherein said driving and driven sheaves are disposed rearwardly of said front axle.

3. An attachment drive in accordance with claim 1 wherein said driving means is a power shaft extending through said front axle.

4. An attachment drive in accordance with claim 1 wherein said driving means is a power take-off shaft journaled in and extending a predetermined distance forwardly and rearwardly of said front axle.

5. A power take-off drive for a tractor having a frame, an engine on the frame, a front axle carrying a part of said tractor and frontal steering wheels journaled on said axle, said drive including
   a drive pulley connected to said engine on the front thereof, said front axle having a top portion and front and rear portions,
   a supporting member disposed between and engaging with said front and rear portions,
   a bearing in said support extending through said front axle in a fore-and-aft direction, and
   a power shaft rotatably supported in said bearing, said shaft being drivingly connected to said drive pulley and positioned such that said power shaft is maintained in a predetermined position when one of said wheels is raised or lowered.

6. A drive in accordance with claim 5 wherein said power drive includes a driven pulley and a drive belt connecting said drive and driven pulleys.

7. A drive in accordance with claim 6 wherein said driven pulley and said drive belt are positioned rearwardly of said front axle.

8. A drive in accordance with claim 6 wherein said power drive includes a driven pulley forward of said front axle.

9. A drive in accordance with claim 5 wherein said supporting member, said bearing and said power shaft are positioned substantially in line with said engine.

References Cited

UNITED STATES PATENTS 2,618,979  11/1952  Benning _____ 74—15.63 X
3,209,604  10/1965  Mitchell et al. _____ 74—15.63

FOREIGN PATENTS 537,759  5/1955  Belgium.

DONLEY J. STOCKING, *Primary Examiner.*

L. H. GERIN, *Assistant Examiner.*